United States Patent
Ackeret et al.

(10) Patent No.: US 9,385,623 B2
(45) Date of Patent: Jul. 5, 2016

(54) CONTROL SYSTEM AND METHOD FOR CONTROLLING A RECTIFIER

(71) Applicant: ABB Technology AG, Zurich (CH)

(72) Inventors: Alexander Ackeret, Niederlenz (CH); Micha Gilomen, Zürich (CH); Wynand Marthinus Lauwrens, Döttingen (CH)

(73) Assignee: ABB Technology AG, Zurich (CH)

(*) Notice: Subject to any disclaimer, the term of this patent is extended or adjusted under 35 U.S.C. 154(b) by 0 days.

(21) Appl. No.: 14/886,210

(22) Filed: Oct. 19, 2015

(65) Prior Publication Data

US 2016/0043655 A1    Feb. 11, 2016

Related U.S. Application Data

(63) Continuation of application No. PCT/EP2014/057949, filed on Apr. 17, 2014.

(30) Foreign Application Priority Data

Apr. 19, 2013  (EP) .................................. 13164393

(51) Int. Cl.
*H02M 7/217*    (2006.01)
*H02M 7/06*    (2006.01)

(52) U.S. Cl.
CPC ...................................... *H02M 7/06* (2013.01)

(58) Field of Classification Search
CPC ... H02M 7/219; H02M 7/217; H02M 7/1623; H02M 7/1626; Y02B 70/126; G05F 1/33; G05F 1/38
USPC .................... 363/81, 82, 84, 87, 90, 125–129
See application file for complete search history.

(56) References Cited

U.S. PATENT DOCUMENTS

| 3,045,170 A * | 7/1962 | Howald .................... G05F 1/33 |
| | | 327/571 |
| 3,087,107 A | 4/1963 | Hunter et al. |
| 3,274,479 A * | 9/1966 | Kurimura .................. G05F 1/33 |
| | | 363/77 |
| 3,317,813 A * | 5/1967 | Schaefer ............... H02M 7/068 |
| | | 363/64 |
| 8,854,774 B1 * | 10/2014 | Nanut ...................... H02H 9/02 |
| | | 361/18 |
| 2002/0118503 A1 * | 8/2002 | Gruening ............... H02M 1/08 |
| | | 361/100 |

OTHER PUBLICATIONS

European Search Report Application No. EP 13 16 4393 Completed: Feb. 5, 2014; Mailing Date: Feb. 17, 2014 9 Pages.
International Search Report & Written Opinion of the International Searching Authority Application No. PCT/EP2014/057949 Completed: Mar. 17, 2015; Mailing Date: Mar. 26, 2015 9 pages.
International Preliminary Report on Patentability Application No. PCT/EP2014/057949 Issued: Oct. 20, 2015;Received: Nov. 3, 2015 8 pages.

* cited by examiner

*Primary Examiner* — Adolf Berhane
(74) *Attorney, Agent, or Firm* — Whitmyer IP Group LLC

(57) ABSTRACT

A system and method for controlling a rectifier due to changing operating conditions including at least one reactor per phase connected to the rectifier for providing an input signal, a bias current for controlling the reactor, and a control current for controlling the reactor. The bias current is fixed to a predefined value which is taken as an input signal for providing a control current compensating the difference between the predefined value of the bias current and a start value defining a start point of the linear operating range of the reactor.

18 Claims, 1 Drawing Sheet

CONTROL SYSTEM AND METHOD FOR CONTROLLING A RECTIFIER

FIELD OF THE INVENTION

The present invention relates to a control system for controlling a rectifier. Further, the present invention relates to a method of controlling a rectifier. In particular, the present invention relates to a control system for controlling a diode rectifier.

BACKGROUND OF THE INVENTION

A rectifier is known to convert an alternating voltage or current signal into a direct voltage or current signal. It is used in a large field of applications and industrial processes.

The controlling of an output voltage of a rectifier is usually done by the following approach: For coarse regulation of the output voltage of the rectifier, a transformer with on-load tap changers (OLTC) is used. For the fine regulation of the output voltage, saturable reactors are used which are coupled to the rectifier for controlling the rectifier. It is common practice in prior art that the controlling of a reactor is implemented by two current circuits: One bias circuit and one control circuit. The current of the bias circuit may be implemented by a one phase variac and a B2 diode rectifier. Alternatively, a transformer with a number of fixed taps on its secondary side and a rectifier circuit may be used. The current of the control circuit may be implemented by a B6 thyristor rectifier. The control circuit usually consists of a controllable direct current source that feeds the control winding of a saturable reactor. Alternatively, the control current may also be a variable alternating current signal, which is rectified by a passive rectifier, for example using diodes.

However, the disadvantage of such an implementation is that for each of these current circuits two separate rectifier bridges are needed—one bridge for the bias current circuit and one bridge for the control current circuit. However, this leads to more complexity and thus to an increase of manufacturing and maintenance cost for the controlling of a rectifier. A further disadvantage is that the variac used for the bias circuit has to be set up manually leading also to an increased amount of service and maintenance time when commissioning and operating such a rectifier system.

In particular during commissioning of the rectifier and in case of changes of process parameters during operating of the rectifier, the bias current and the control current range need to be adapted to allow for an optimum control response of the rectifier system. This adjustment is usually done manually to find optimum values for a suitable linear operating range in the characteristic hysteresis curve of the controllable reactor element. However, this is often time-consuming when there is a need to react promptly due to changes of process parameters. The rectifier must then adopted to the new process parameters to allow for an optimum control response of the technical system coupled to the rectifier.

An objective of the present invention is to provide an improved control system for controlling a rectifier in order to make it simpler and faster to configure and to adopt the operating of a rectifier. In particular, in cases when the operating conditions of the rectifier are changing the operating behavior of the rectifier should be adopted accordingly in order to be able to operate the rectifier in an optimal operating range. Another technical object of the present invention is to provide an improved control system for controlling a rectifier reducing the amount of manufacturing and maintenance costs. A further technical object of the present invention is to provide for an improved method for controlling a rectifier in order to reduce the time for adjustment of the rectifier in case of changes of process parameters and as a result providing an optimum control response for the technical system that may be coupled to the rectifier.

SUMMARY OF THE INVENTION

The solution is to provide for a control system for controlling a rectifier as defined by the features of the invention. A further solution is to provide for a method for controlling a rectifier with a control system as defined by the features of the invention. Preferred examples of the invention are set forth by the appended dependent claims.

The core idea of the present invention is a control system for controlling a rectifier comprising at least one reactor per phase connected to the rectifier for providing an input signal to the rectifier, further means for providing a bias current for controlling the reactor and means for providing a control current for controlling the reactor. The bias current is fixed to a predefined value which is taken as an input signal for the means for providing a control current, whereas means for providing a control current compensates the difference between the predefined value of the bias current and a start value defining a start point of the linear operating range of reactor.

An important aspect of the invention is that the output parameters of a rectifier, preferably a diode rectifier, such as the output voltage or output current, can be controlled by controlling a regulator that is connected to the rectifier. The reactor itself is controlled by a bias current and/or a control current that is provided by means of a bias current circuit and a control current circuit. The electrical behavior of the reactor depends on its characteristic hysteresis curve defining the operating range of the reactor. The form of the hysteresis curve depends on operating parameters of the reactor and thus, may change depending on varying external conditions such as signal disturbances, temperature affecting the behavior of the reactor. As known to a person skilled in the art, the reactor should preferably be operated in a linear range of said hysteresis curve. Compared to prior art, the inventive control system uses a predefined value which is an offset value that is measured and that is used as an input signal for controlling the reactor.

The linear operating range of said hysteresis curve of said reactor is defined by a start value defining the start point and an end value defining the end point of the linear operating range of said reactor.

Depending on the position of the offset value on said hysteresis curve of said reactor, a control current is provided by means using a control current circuit to compensate the difference between said offset value and the start point of the linear operating range of said reactor. Thus, also the start point of the linear operating range of said reactor may have changed due to signal disturbances affecting the reactor and thus, the position and form of its characteristic hysteresis curve, the inventive control system is able to level and balance the difference between the offset value and the start point of the linear operating range of said reactor making it easier and faster to find the start point of the linear operating range of said reactor.

One advantage of the present invention is that the bias current which is simply a predefined offset value, can be set as a parameter during commissioning of the rectifier. This allows short commissioning times of the rectifier system. Further, it is much simpler and faster to set up the rectifier to a desired operating mode as a minimum of time is essential to find the linear operating range of the reactor. Thus, an iterative process of finding the starting and end point of the linear operating range of said reactor as common in prior art is no longer necessary.

The inventive control system also allows the rectifier to be more robust to external signal disturbances influencing the operating of the rectifier system such as signal noise. Even if signal disturbances influencing the rectifier, the inventive control system enables one to set the behavior of the rectifier to its preferred linear operating mode more quickly and efficiently.

A further advantage of the present invention is that it can be implemented very easy into different technical systems such as control and communication systems, because it provides defined interfaces that can be connected to external systems components. The inventive control system itself operates mainly autarkic and thus, it can be operated independent from control and communication systems which are connected to the inventive system.

A further core aspect of the present invention is providing a method for controlling a rectifier by a control system having at least one reactor which is coupled to a rectifier. The reactor having an operating behavior defined by a characteristic control curve such as a hysteresis curve and the reactor is coupled to the rectifier, wherein the reactor controls the rectifier.

The method comprises the following steps:
Setting a bias current value as a predefined value by means for controlling the reactor;
Finding a start value defining the start point of an linear operating range within a control curve of the reactor by compensating the difference between the predefined value of the bias current which is taken as an input signal for means providing a control current for controlling the reactor and the start value;
Finding an end value defining the end point of the linear operating range of said reactor, whereas the start point and end point define the linear operating range within the control curve of said reactor It should be noted in a general view that the start point and end point defining the linear operating range of the reactor is or can be set by an automatic tuning.

In should be noted in a more detailed view that the start point of the linear operating range of the reactor is a control current value provided by means for providing a control current such as a control current circuit which is coupled to the at least one reactor. The automatic setting of the control current aims to compensate a difference between a predefined bias current value which is set in a first step and said start point. The bias current value may be a fixed offset parameter. The bias current value may match with the start point of the linear operating range of the reactor, but if the predefined bias current value differs from said start point, a control current value has to be set to compensate the difference between predefined bias current value and said start point. This can also be done by automatic tuning.

The automatic tuning allows the bias and control current limits to be set automatically. The object of finding and setting the limits of the bias and control current values is to have a maximum linear control range for the reactor affecting the control of the rectifier. It should be noted that the automatic tuning may also be done in a semi-automatic way using a transformer with fixed taps that are selected during commissioning to set the bias current.

A further implementation of the automatic tuning is that it can also work for a control system having just a single control current circuit providing a control current without a separate bias circuit providing a bias current. This advantageously allows a much faster commissioning of the rectifier, as the time consuming process of finding the optimum settings for the linear operating range of the reactor manually can be prevented.

It should be further noted that the bias current value as a predefined value to a fixed value can be set during commissioning of the rectifier either manually or automatically, but it can also be set to a different value during the automatic re-tuning of the start point and end point of the linear operating range of the reactor.

A further advantage of using an automatic tuning of the limits of bias and/or control current values is that it reduces the dependency on manual commissioning in finding the optimum settings for the control circuit. The automatic tuning also allows the control circuit to be re-tuned without the need for a service engineer to be on site of the technical system. The re-tuning also allows the control circuit to be set to the optimum linear operating range, even during operating of the rectifier, whenever the process parameters are being changed or being influenced by signal disturbances.

It should be further noted that by using a control circuit for each reactor separately a current imbalance between phases can be equalized.

According to a first preferred embodiment of the control system for controlling a rectifier used in industrial applications like aluminium electrolysis, the start point of the linear operating range of the reactor is dependent on process parameters. These process parameters could be the input voltage and/or current of the rectifier. The advantage of the inventive control system is an increased flexibility in the operating of the rectifier mainly independent from the reactor characteristics controlling the rectifier. Further, faster and more exact results can be achieved when adopting the rectifier to external signal changes or varying operating modes.

In a further embodiment of the invention, the predefined offset value for the bias current provided by means such as a bias current circuit depends on a characteristic hysteresis curve of the reactor defining the electrical signal behavior of the reactor. As the form of the hysteresis curve may change due to signal disturbances affecting the reactor and rectifier system, the predefined offset value of the bias current may also change. However, this change can then be corrected and compensated by an appropriate control current provided by means such as a control current circuit.

It should be noted that the predefined offset value may match with the start point defining the beginning of the linear operating range of the reactor, but this may be an exceptional case. Thus, in the effort in finding said start point, the difference to the predefined offset value has to be compensated. This is achieved by providing a control current by a control current circuit having an appropriate value.

Further, it should be noted that the inventive control system comprising a bias current circuit as means for providing a bias current and means comprising a control current circuit for providing a control current.

However, the inventive control system may also work in the way that a control current circuit is used alone in the control system without using a bias current circuit meaning that the rectifier is exclusively controlled by a control current circuit. This has the advantage of using a reduced number of electrical components and thus, leading to a decrease of costs for operating and maintaining the rectifier.

It should be further noted that by using a control circuit for each reactor separately a current imbalance between phases can be equalized.

In a preferred embodiment at least one reactor is installed in or outside a transformer compartment of the system depending on the requirements of the rectifier application.

In a further embodiment of the inventive control system an on-load-tap changer is connected to a transformer department for a coarse control of an output signal of the rectifier. This has the advantage that costs of the control system are reduced, as the dimensions of the reactor can be reduced significantly, thus reducing the reactive power of the reactor.

According to a preferred embodiment the bias current circuit and the control current circuit are interconnected to each other. This has the advantage that only a current circuit with a single winding in the reactor needs to be used and thus, reducing component costs of the rectifier system.

According to a preferred embodiment the bias current circuit and the control current circuit are two separate current circuits. This is also a preferred embodiment of the invention as signal overlapping is reduced. In case of a failure of the control current circuit this embodiment helps to prevent excessing of current limits which would lead to switching off the rectifier due to security reasons, because usually the components of the bias current circuit are more robust to signal disturbances.

According to a preferred embodiment the means for providing a bias current and the means for providing a control circuit are implemented within a control unit in order to reduce space needed by the rectifier.

According to a preferred embodiment means for providing a control current circuit are containing a software module.

According to a preferred embodiment the inventive control system for controlling a rectifier is implemented in a rectifier. The application of the inventive control system is not restricted to a specific rectifier application and thus, the inventive system may also be implemented in a system for controlling a diode rectifier.

According to a preferred embodiment of the method for controlling a rectifier, the start point and end point defining the linear operating range of the reactor may be set by an automatic tuning. The automatic tuning of the minimum and maximum limit values of the linear operating range within the control curve of the at least one reactor per phase enables the system to keep within the linear operating range of said reactor, even if the operating mode of the rectifier changes due to external new parameters or signal disturbances affecting the operating mode of the rectifier. The automatic tuning also allows a quick and optimum control response when the operating conditions of the rectifier are changing.

A further advantage of the automatic tuning of the values of the start and end limits of an linear operating range within the control curve of said reactor is that a periodical adjustment of these limits can be conducted when process changes during operating of the rectifier are registered. The frequency of conducing the automatic tuning depends on the output voltage of the rectifier. For example, if a predefined limit of the output voltage of the rectifier has been exceeded, the automatic tuning is started. Thus, it is possible to react quickly on process changes such as signal changes and changes in load coupled to the rectifier and which may influence the operating behavior of the rectifier. Therefore, the quality of maintenance is significantly increased by using an automatic tuning instead by finding said minimum and maximum values of the linear operating range of said reactor manually.

A further advantage of continuous automatic tuning is, that the current control is operated as effectively as possible giving the customer the highest possible average current and thus the highest possible production.

A further advantage of continuous automatic tuning is that the tap changer operation is reduced to the lowest possible and thus, the maintenance of the tap changer device can be reduced to a minimum.

The further inventive objects, alternatives and features of the present invention will become apparent from the following detailed description of preferred embodiments of the invention in conjunction with the drawing.

DETAILED DESCRIPTION OF THE INVENTION

Figure 1:
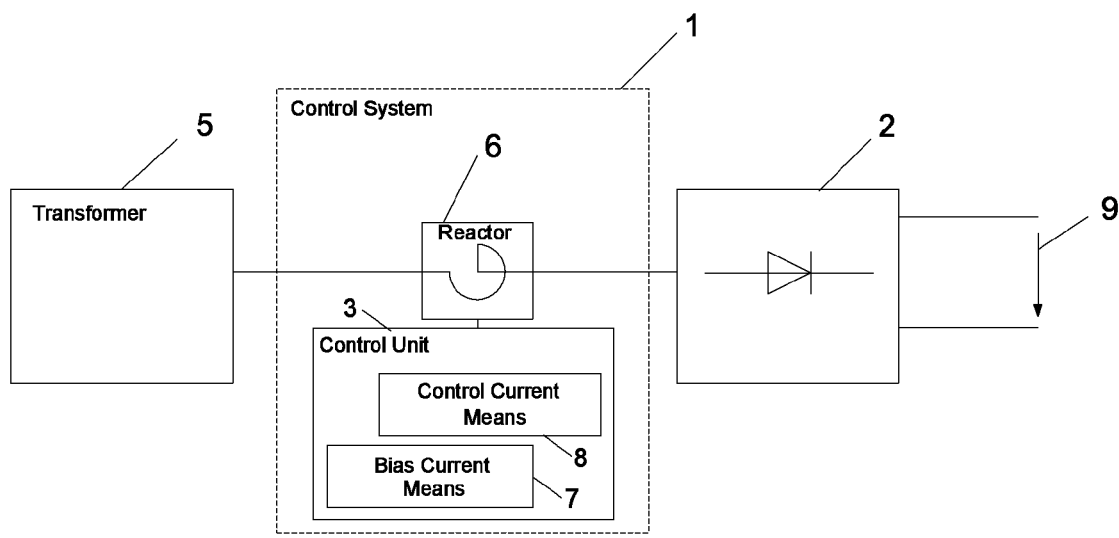
FIG. 1 shows an example of the inventive control system connected to a rectifier.

The reference symbols used in the drawing and their meanings are listed in summary form in the reference list. In principle, the same parts are provided with the same reference symbols in the figures. Any described embodiment represents an example of the subject-matter of the invention and does not have any restrictive effect.

FIG. 1 shows a control system 1 for controlling a rectifier 2 with an output signal 9 which may be an output voltage or output current to a load (not shown) coupled to the rectifier 2. The rectifier 2 may be a diode rectifier. The load may be an aluminium electrolysis application for example. The control system 1 comprises at least one reactor 6 per phase, means 7 for providing a bias current for controlling the reactor 6 and means 8 for providing a control current for controlling the reactor 6. Preferably, the means 7 and means 8 are stored in a control unit 3 that is coupled to the at least one reactor 6.

In another embodiment of the present invention, the control unit 3 that is coupled to the at least one reactor 6, may also only comprise means 8 having a single winding circuit.

Further, a single control unit 3 may be coupled to a plurality of reactors 6 of the control system 1. The single control unit 3 may therefore operate a plurality of reactors 6 of the control system 1.

In an alternative embodiment of the present invention, if the control system 1 comprises a plurality of reactors 6 for each phase, it is possible that for each reactor 6 per phase, a single a control unit 3 is coupled to said reactor 6. In such a structure, the plurality of control units 3 is coupled to said plurality of reactors 6. Therefore, in such an alternative embodiment of the present invention, each control unit 3 of the plurality of said control units 3 operates at least one reactor 6 of the plurality of said reactors 6.

As another example, it would be possible to operate two reactors of one phase with just one control unit 3.

The reactor 6 is coupled to the rectifier 2 for providing an input signal to the rectifier 2. The means 7 for providing a bias current for controlling the reactor 6 and means 8 for providing a control current for controlling the reactor 6 are connected to the reactor 6. The at least one reactor 6 is coupled to a transformer 5 that may also comprise an On-Load-Tap-Changer (not shown) for coarse control of an output voltage of the rectifier. According to another aspect of the present invention, the reactor 6 is controlled to control the output signal 9 which may be an output voltage or output current of the rectifier 2. The operating behavior of the reactor 6 depends on its hysteresis curve that may change due to operating parameters such as external signal disturbances influencing the behavior of the reactor.

In order to ensure that the reactor 6 is operated in a linear operating range of its hysteresis curve while taking account a different operating mode of the rectifier 2 or signal disturbances affecting the reactor 6, the start point and the end point of the linear operating range of the reactor have to be set up accordingly. This is done by the inventive control system in the way that the bias current is fixed to a predefined value which is taken as an input signal for the means 8 for providing a control current for controlling the reactor, whereas means 8 compensates the difference between the predefined value of the bias current and a start value defining a start point of an linear operating range of reactor 6. The end point refers to a fixed value of means 8, where the end of the linear operating range of said reactor 6 is reached.

Figure 2:
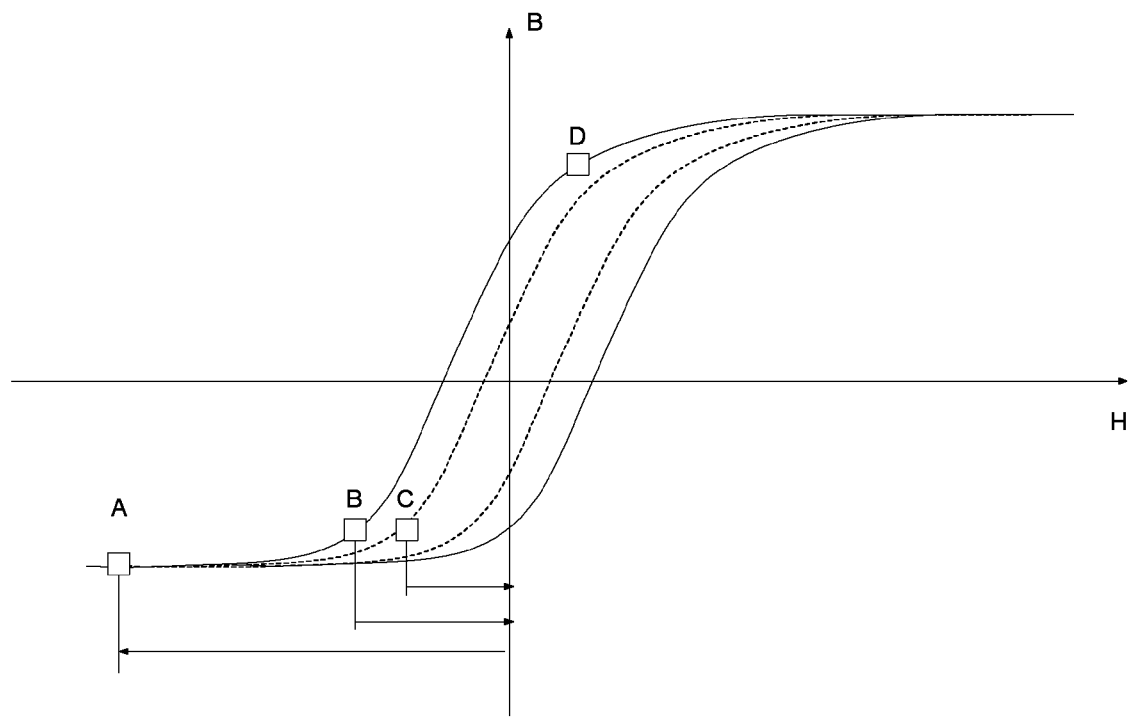
FIG. 2 shows an example of a characteristic control curve of a reactor

FIG. 2 shows an example of a characteristic control curve of an at least one reactor 6 as displayed in FIG. 1. The reactor 6 is connected to the rectifier 2 for providing an input signal to the rectifier 2 for controlling a rectifier 2. In FIG. 2, the characteristic control curve of a reactor 6 is depicted as a hysteresis curve.

In the following, the meaning of the points A, B, C and D within the hysteresis curve of FIG. 2 is explained.

Point A is a characteristic value for a bias current value as a predefined value that is set by means 7 for controlling the reactor according to FIG. 1.

Point B is characteristic for a start value defining a start point of a linear operating range B-D within the control curve of a reactor 6 as shown in FIG. 1. The start point B is determined by compensating the difference between a predefined value of the bias current represented by point A in FIG. 2 which is taken as an input signal for means 8 as shown in FIG. 1 and providing a control current for controlling the reactor 6 and the start value.

Point D defines the end point of the linear operating range B-D of a reactor 6 as shown in FIG. 1, whereas the start point B and end point D define a linear operating range B-D within the control curve of the reactor 6.

It should be noted that points B and D in the hysteresis curve can be preferably found by an automatic tuning sequence.

Point C is taking into account the scenario when the position or form of the hysteresis curve of the reactor is changing due to operation circumstances which may influence said the at least one or more reactor components 6. In such a case, the automatic tuning can ensure that the start point B of the linear operating range B-D of said reactor 6 may be adjusted automatically to meet the changed operating conditions. An example for this scenario may be a changed DC-voltage of an industrial pot-line process application.

What is claimed is:

1. A control system for controlling a rectifier having:
   at least one reactor per phase connected to the rectifier for providing an input signal to the rectifier,
   means for providing a bias current for controlling the reactor,
   means for providing a control current for controlling the reactor, characterized in that the bias current is fixed to a predefined value which is taken as an input signal for the means for providing a control current for controlling the reactor, whereas means for providing a control current for controlling the reactor compensates the difference between the predefined value of the bias current and a start value defining a start point of the linear operating range of the reactor.

2. The control system according to claim 1, characterized in that the start point of the operating range of the reactor depends on process parameters of the rectifier.

3. The control system according to claim 1, characterized in that a predefined offset value for the bias current depends on a characteristic hysteresis curve of the reactor.

4. The control system according to claim 2, characterized in that a linear operating range within the hysteresis curve of the reactor is defined by a start value defining the start point and an end value defining the end point of the linear operating range of the reactor.

5. The control system according to claims 1, characterized in that the means for providing a bias current for controlling the reactor comprising a bias current circuit and the means for providing a control current for controlling the reactor comprising a control current circuit.

6. The control system according to claim 5, characterized in that the bias current circuit and the control current circuit are interconnected to each other.

7. The control system according to claim 5, characterized in that the bias current circuit and the control current circuit are two separate current circuits.

8. The control system according to claim 5, characterized in that the control system comprises a control current circuit.

9. The control system according to claims 1, characterized in that an on-load-tap changer is connected to a transformer department for a coarse control of an output signal of the rectifier.

10. The control system for controlling a rectifier according to claims 1, characterized in that the control system comprises a control unit.

11. The control system for controlling a rectifier according to claim 10, characterized in that the control unit comprises means for providing a bias current for controlling the reactor and means for providing a control current for controlling the reactor.

12. The control system for controlling a rectifier according to claim 10, characterized in that the control unit only comprises means for providing a control current for controlling the reactor.

13. The control system for controlling a rectifier according to claims 10, characterized in that the control system comprising a plurality of control units, wherein each control unit of the plurality of said control units, is coupled to at least one reactor per phase and being able to operate at least one reactor per phase.

14. The control system for controlling a rectifier according to claims 10, characterized in that the control system comprising a single control unit that is coupled to a plurality of reactors of the control system and being able to operate the plurality of said reactors.

15. The control system for controlling a rectifier according to claims 1, characterized in that means for providing a control current for controlling the reactor contains a software module.

16. A rectifier comprising a control system according to claims 1.

17. A method for controlling a rectifier controlled by at least one reactor per phase connected to the rectifier for providing an input signal to the rectifier comprising the steps:
   Setting a bias current value as a predefined value by means for controlling the reactor;
   Finding a start value defining a start point of a linear operating range within a control curve of the reactor by compensating the difference between the predefined value of the bias current which is taken as an input signal for means providing a control current for controlling the reactor and the start value;
   Finding an end value defining the end point of the linear operating range of said reactor, whereas the start point and end point define the linear operating range within the control curve of said reactor.

18. The method for controlling a rectifier according to claim 17, characterized in that the start point and end point defining the linear operating range of the reactor are set by an automatic tuning.

\* \* \* \* \*